United States Patent [19]

Hall

[11] 4,177,180
[45] Dec. 4, 1979

[54] COMPOSITION COMPRISING RESIN AND PIGMENT FOR AUTODEPOSITION

[75] Inventor: Wilbur S. Hall, Plymouth Meeting, Pa.

[73] Assignee: Amchem Products, Inc., Ambler, Pa.

[21] Appl. No.: 718,605

[22] Filed: Aug. 30, 1976

Related U.S. Application Data

[63] Continuation-in-part of Ser. No. 613,717, Sep. 15, 1975, abandoned.

[51] Int. Cl.$^2$ ............................ C08L 9/08; C08L 9/10
[52] U.S. Cl. ............................ 260/29.7 H; 106/308 M; 260/29.7 T; 260/29.7 M; 260/42.55
[58] Field of Search ............................ 260/29.7 H, 29.7 T, 260/29.7 M, 42.55; 106/308 M

[56] References Cited

U.S. PATENT DOCUMENTS

| | | | |
|---|---|---|---|
| 2,688,605 | 9/1954 | Tucker | 260/42.55 |
| 3,438,926 | 4/1969 | Burke et al. | 260/29.7 M |
| 3,449,291 | 6/1969 | Lerman et al. | 260/42.55 |
| 3,472,808 | 10/1969 | Isgur et al. | 260/29.7 R |
| 3,554,888 | 1/1971 | Seitz | 260/29.7 H |
| 3,585,084 | 6/1971 | Steinbrecher et al. | 427/309 |
| 3,592,699 | 7/1971 | Steinbrecher et al. | 427/309 |
| 3,709,743 | 1/1973 | Dalton et al. | 427/309 |
| 3,856,745 | 12/1974 | Yamaguchi et al. | 106/308 M |

FOREIGN PATENT DOCUMENTS

| | | | |
|---|---|---|---|
| 784512 | 10/1957 | United Kingdom . | |
| 825345 | 12/1959 | United Kingdom . | |
| 1299067 | 12/1972 | United Kingdom | 260/29.7 H |

*Primary Examiner*—Maurice J. Welsh
*Attorney, Agent, or Firm*—Dale Lynn Carlson

[57] ABSTRACT

An aqueous composition comprising resin and pigment for use in an acidic aqueous coating composition, wherein substantially all the resin is associated with pigment, such that when said coating composition is applied to a metallic surface a resinous coating having uniform color is formed; the acidic aqueous coating composition, having resin and pigment therein, is of the type which forms on a metallic surface immersed therein a resinous coating which increases in thickness or weight the longer the time the surface is contacted with the coating composition; aqueous resin/pigment concentrate for use in the coating composition is prepared by combining an aqueous dispersion of resin solids with an aqueous dispersion of pigment solids in a manner such that substantially all of the resin solids have substantially the same opportunity to associate with the pigment solids.

22 Claims, 2 Drawing Figures

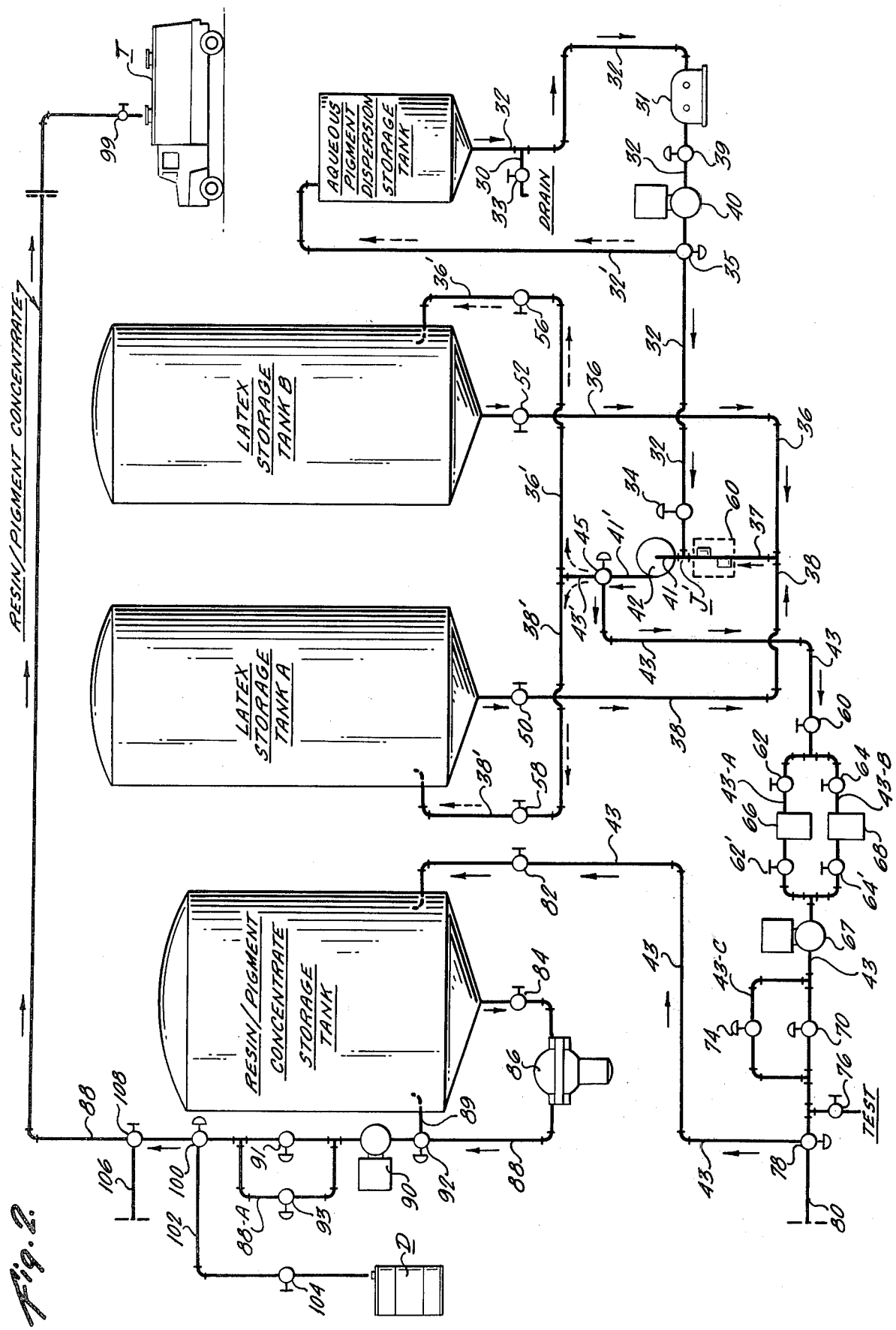

COMPOSITION COMPRISING RESIN AND PIGMENT FOR AUTODEPOSITION

CROSS-REFERENCE TO RELATED APPLICATION

This is a continuation-in-part of copending application Ser. No. 613,717, filed Sept. 15, 1975, now abandoned.

FIELD OF THE INVENTION

A relatively recent development in the coating field is the provision of acidic aqueous coating compositions which form organic coatings on metallic surfaces, without the aid of an external source of electricity, in a manner such that the coatings increase in thickness or weight the longer the time the surfaces are immersed in the coating composition. Generally, the acidic aqueous coating composition will have dispersed therein solid polymeric or resinous particles. For convenience, such organic coatings are referred to hereinafter as "organic or resinous coatings which grow with time" or as "autodeposited coatings", and compositions which form autodeposited coatings are referred to as "autodepositing compositions".

It has been found that during the formation of autodeposited coatings, the acidic aqueous coating composition dissolves metal from the metallic surface contacted therewith to provide metal ions which, it is believed, cause deposition of the polymeric or resinous coating-forming material. By way of example, when an iron or steel surface is immersed in an aqueous acidic coating composition containing dispersed resin particles, iron is dissolved from the surface to provide metal ions in the region of the surface thereby causing the dispersed resin particles to deposit onto the metallic surface in a manner such that there is a continuous build-up of resinous coating on the surface.

U.S. Pat. Nos. 3,585,084 and 3,592,699, assigned to the same assignee as the present invention, disclose compositions for coating metal surfaces comprising an organic coating-forming material, an oxidizing agent and an acid. Among the preferred compositions disclosed therein is one comprising a resin dispersion, hydrofluoric acid, and an oxidizing agent selected from the group consisting of hydrogen peroxide and dichromate.

U.S. Pat. No. 3,709,743 discloses acidic aqueous coating compositions having dispersed resin solids and nitric acid. South African Pat. No. 72/1146 discloses an aqueous acidic coating composition prepared from an acid, a soluble ferric iron compound, dispersed resin solids, and, optionally, an oxidizing agent. The preferred coating composition described therein is prepared from hydrofluoric acid, ferric fluoride, and dispersed resin solids. Belgian Patent of Addition No. 811,841 discloses the use of other metal compounds such as, for example, a compound of copper, cobalt, or silver in aqueous acidic coating compositions which form resin coatings which grow with time.

Coatings formed from the aforementioned coating compositions are distinctly different from coatings formed by immersing a metal surface in a conventional latex composition comprising a resin dispersed in water. The weight or thickness of a coating formed by immersing a metal surface in a conventional latex is not affected by the time the surface is immersed in the coating composition. In order to obtain a thicker coating, it has been necessary to subject the surface to a multiple stage coating operation or to employ coating compositions having a higher solids content, that is, a higher amount of resin solids dispersed therein.

Autodeposited coatings offer a number of important advantages. Thicker resinous coatings can be formed on a metal surface in a shorter period of time and in a one-step operation. Coatings produced also have been found to have improved corrosion resistant properties.

Many of the resins used in forming autodeposited coatings are such that after the coating is fused or cured, it is clear or transparent. For various applications, the aforementioned autodepositing compositions are pigmented to impart a colored appearance to the coating. A problem that has been encountered in the use of an industrially prepared autodepositing composition that has been pigmented is that it tends to form a coating which is not uniform in appearance. For example, in coating rectangular steel panels with a black pigmented coating composition, coatings have been obtained which are light or transparent at the face edges of the panel, while the remainder and major portion of the coating is uniformly black. The light or transparent coating at the face edges can extend as much as a ¼ inch or more from the edges, with the tinctorial strength of the coating progressively increasing in the coated areas removed from the face edges of the panel. In effect, each of the faces of the panel has a border of light or transparent coating. The lack of tinctorial strength of the coatings at the face edges of the panel makes it appear as if insufficient coating has been deposited on these areas of the panel. However, measurements have shown that this is not so, that is, the thickness of the coating on the entire panel face is substantially the same. For some applications, such nonuniformity in tinctorial strength may not be important, but in applicatons where decorative effects and aesthetics of the coated surface are important, it is not desirable.

A perplexing aspect of the above described problem is that it has been encountered only under certain conditions. The problem has not been encountered with a panel immersed in an autodepositing composition and held stationary therein or moved slowly with a to and fro motion. However, it has been encountered with a panel moved with a rapid to and fro motion while immersed in the composition. It is noted that it is advantageous to maintain relative movement between the substrate and composition because such movement increases the rate at which coating is deposited on the substrate.

Other observations related to this preplexing problem have been made. By way of background, it is first noted that in formulating and operating on an industrial scale a bath of autodepositing composition, which, for example, may comprise 25,000 to 50,000 gallons of composition, it is expedient to formulate an aqueous concentrate containing the resin and pigment by combining an aqueous dispersion of the resin, for example, a latex, with an aqueous dispersion of the pigment. The bath is prepared by combining the concentrate with the other ingredients comprising the composition, including additional water to dilute the concentrate to the desired resin/pigment solids content of the bath. The concentrate can be used also to replenish the bath as the resin and pigment are depleted during use.

It has been observed that autodepositing compositions formulated from aqueous/resin pigment concentrates prepared in laboratory size quantities, for example, one or several liters, form coatings which have uniform tinctorial strength, that is, the coatings do not have light or transparent face edges. On the other hand, the problem of coatings having non-uniform tinctorial strength has been encountered when using autodepositing coating compositions prepared from aqueous resin/pigment concentrates prepared in industrial size quantities, for example, several thousand gallons. It is noted that the ingredients and proportions thereof comprising each of the aforementioned concentrates and compositions were the same and that the same basic mixing techniques were used in preparing both the laboratory and industrial size quantities of concentrates and in combining the ingredients comprising the autodepositing compositions.

It has been observed also that aqueous resin/pigment concentrates prepared in industrial quantities by using conventional mixing techniques have a homogeneous appearance after the mixing operation is completed. However, upon standing, ingredients of the concentrate separate into two layers with the lower layer comprising an aqueous dispersion of pigment and resin and the upper layer comprising an aqueous dispersion of resin, with little or no pigment. Mixing of the two layers results in what appears to be a uniform or homogeneous mixture of the resin and pigment solids. It has been found that autodepositing compositions formulated from resin/pigment concentrates exhibiting the above described characteristics form coatings which do not have uniform tinctorial strength. In contrast, aqueous resin/pigment concentrates prepared in laboratory quantities by using the same mixing technique have been observed to be homogenously stable, and their use in autodepositing compositions, as mentioned above, does not result in the formation of coatings having non-uniform tinctorial strength.

It is an object of this invention to provide an industrial autodepositing composition which forms coatings having uniform tinctorial strength.

Another object of this invention is to provide an aqueous composition comprising particles of resin and pigment dispersed therein such that there is no separation of pigmented and unpigmented layers.

SUMMARY OF THE INVENTION

In accordance with this invention, coatings having improved uniform tinctorial strength are formed by utilizing an aqueous resin/pigment composition comprising resin particles and pigment particles in which substantially all of the resin particles are associated with pigment particles. An autodepositing composition formulated from such a resin/pigment composition or concentrate is effective in forming on a metallic surface contacted therewith resinous coatings which have improved uniformity in tinctorial strength, as will be seen from examples reported below.

Also, in accordance with this invention there is provided a process for preparing an aqueous composition having dispersed therein organic coating-forming solids and pigment solids in a predetermined ratio comprising providing an aqueous dispersion of said coating-forming solids and an aqueous dispersion of said pigment solids, combining each of said aqueous dispersions under conditions whereby substantially all of said coating-forming solids have substantially the same opportunity to associate with said pigment solids, the amounts of the coating-forming and pigment solids combined being that needed to provide said ratio, and including subjecting the combined coating-forming and pigment solids to a mixing action, said mixing action being effected prior to significant diffusion of said aqueous dispersions.

According to the invention, a preferred process for preparing an aqueous resin/pigment composition having a predetermined resin/pigment ratio comprises: (A) forming a stream of an aqueous dispersion of resin solids having a predetermined amount of resin solids; (B) forming a stream of an aqueous dispersion of pigment solids having a predetermined amount of pigment solids; (C) combining each of said streams to form a combined stream of said resin and pigment solids; (D) establishing and maintaining the flow rates of said streams of (A) and (B) to provide said resin/pigment ratio when said streams are combined; and (E) subjecting the resin and pigment solids of said combined stream to mixing action promptly after said combined stream is formed.

Aqueous organic coating-forming solids/pigment concentrates prepared in accordance with the process of the present invention can be used in formulating autodepositing compositions which form pigmented coatings having improved uniform tinctorial strength. Such concentrates can be prepared in industrial size quantities, for example, 50 gallons or more. In addition, such concentrates are homogeneously stable compared to the aforementioned concentrates described above, that is, those which separate into two layers within a short time after being prepared, for example, within about ½ to 1 hour.

Study and analysis of the mixing process comprising the present development and the results achieved, as compared to mixing processes which produce concentrates that give rise to the tinctorial strength problem, appear to indicate the following. An example of the latter type of mixing process includes pumping the desired amount of aqueous resin dispersion into a tank, typically several thousand gallons, equipped with a paddle mixer. (It is noted that the volume of resin dispersion comprising the concentrate is usually much greater than that of the pigment dispersion, for example, 25X greater.) The mixer is started as the desired amount of aqueous pigment dispersion is added to the resin dispersion, with mixing being continued until the resin and pigment dispersions are thoroughly intermixed, that is, until the mixture appears visually to be homogeneous. For reasons explained below, it is believed that in this type of mixing process, substantial amounts of pigment particles become associated with relatively small amounts of resin particles. In other words, it is believed that there is a substantial amount of resin solids not associated with pigment solids. (And yet the mixed concentrate visually appears to be homogeneous.) Once the above type resin/pigment association is formed, it appears to be irreversible. Mixing for several days had no effect on the performance of an autodepositing composition prepared therefrom.

In contrast, the mixing process of the present invention combines the resin and pigment solids in a manner such that substantially all of the resin solids have the same opportunity to associate with the pigment solids. Given this opportunity it is believed that when the resin and pigment solids are subjected to a mixing action, a higher uniform distribution of associated resin pigment solids is achieved. The mixing process of the present invention, applied to the preparation of resin pigment concentrates in large industrially sized quantities, for example, several thousand or more gallons, in effect produces a concentrate which has the desired characteristics of laboratory amounts of concentrate prepared by the mixing technique described in the paragraph immediately above, but which mixing technique, when used to prepare batches of concentrates in amounts as small as 5 to 10 gallons, produces concentrates having characteristics such that autodepositing compositions prepared therefrom form coatings having light or transparent face edges and such that phase separation is encountered.

BRIEF DESCRIPTION OF THE DRAWINGS

FIG. 2 is a flow diagram illustrating different apparatus for use in a process embodiment of the invention.

DETAILED DESCRIPTION OF THE INVENTION

Figure 1:
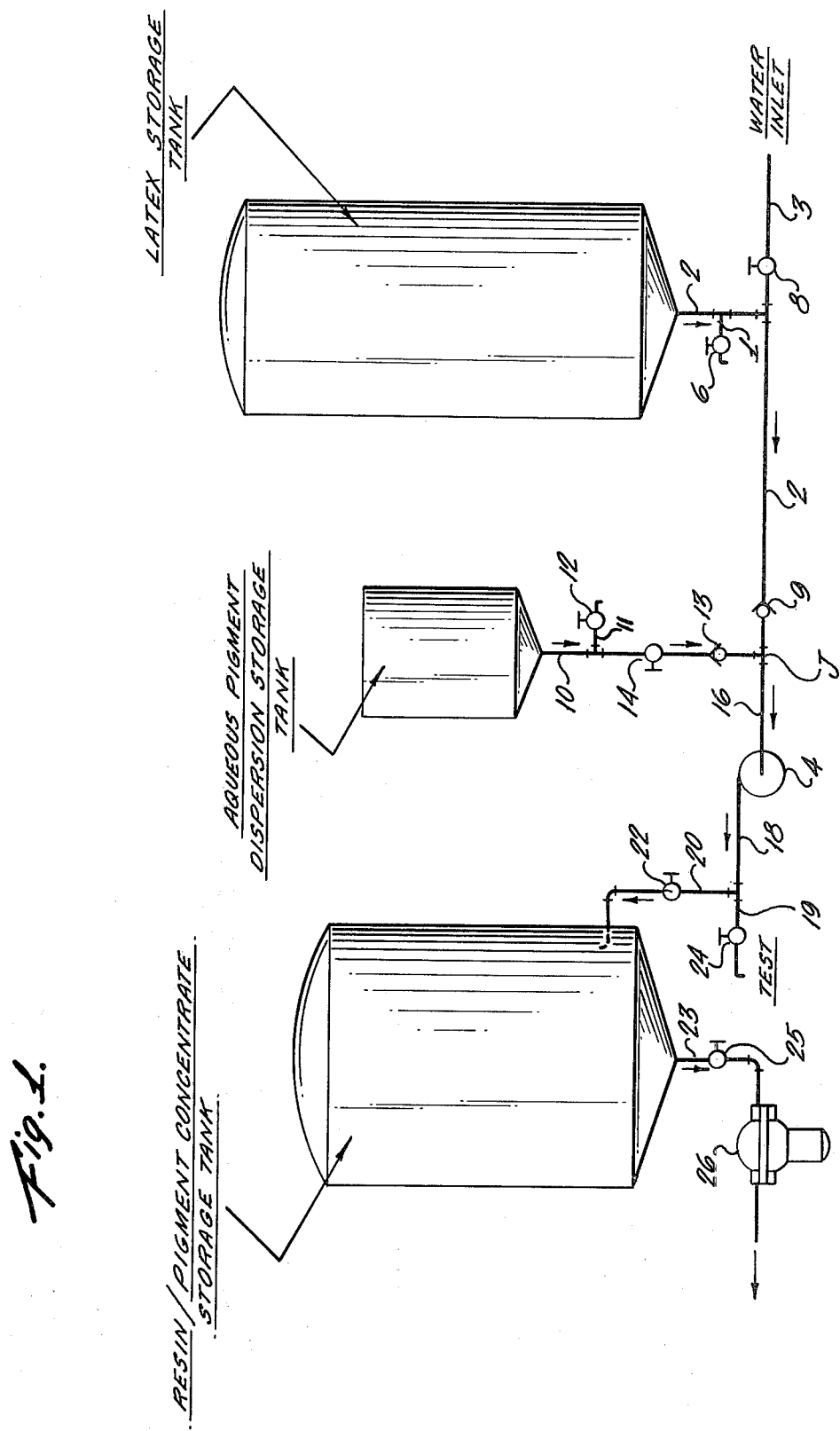
FIG. 1 is a flow diagram illustrating apparatus for use in a process embodiment of the invention.

FIG. 1 is a flow diagram illustrating equipment that can be used in preparing an aqueous resin/pigment concentrate having a predetermined resin/pigment ratio according to the present invention. The system shown in FIG. 1 is designed for manual control of the flow rate of an aqueous pigment dispersion to provide said predetermined ratio.

Latex (an aqueous dispersion of resin solids) having a predetermined resin solids concentration is pumped from the latex storage tank through pipe 2 by the centrifugal pump 4 at a predetermined flow rate with valve 6 and valve 8 each in the closed position. Pipe 1 and valve 6 can be used to drain the latex from its storage tank, if necessary. Pipe 3 which feeds into pipe 2 is connected to a source of water (not shown) which can be used to flush the connecting pipes of the system as desired, with valve 8 being used to control the flow of the water.

Aqueous pigment dispersion having a predetermined pigment solids concentration is pumped, also by centrifugal pump 4, from its storage tank through pipe 10 with valve 12 in the closed position and control valve 14 in the open position. Pipe 11 and valve 12 can be used to drain the pigment dispersion from its storage tank, if necessary.

Check valves 9 and 13 prevent downstream materials from reversing direction and contaminating the latex and pigment dispersion raw materials.

Pipe 10 carrying a stream of the pigment dispersion opens into pipe 2 carrying a stream of latex at juncture J where each of the streams is combined. The stream containing the combined pigment dispersion and latex flows through pipe 16 into centrifugal pump 4 where it is subjected to a mixing action and the resulting mixture flows through pipes 18 and 20 into the resin/pigment concentrate storage tank, with valve 22 being in the open position and valve 24 being in the closed position. The resin pigment concentrate storage tank is provided with pipe 23, valve 25 and pump 26 for removing concentrate from the tank. The concentrate can be pumped into appropriately sized drums or tank trucks for customer delivery or it can be pumped, as needed, directly to a bath of autodepositing composition.

Centrifugal pump 4 is positioned with respect to the juncture J where the aforementioned streams are combined in a manner such that the stream of combined pigment dispersion and latex is promptly subjected to a mixing action which thoroughly mixes the pigment dispersion and latex. Such mixing action is effected prior to the time any significant diffusion takes place between the pigment dispersion and latex in the combined stream flowing in pipe 16. Promptly subjecting the combined pigment dispersion and latex to the mixing action of the centrifugal pump 4 is effective in giving substantially all of the resin solids substantially the same opportunity to associate with pigment solids. If significant diffusion is allowed to take place prior to the aforementioned mixing action, an undesired relatively small proportion of resin solids is apt to associate with a substantial amount of the pigment solids resulting in a high proportion of resin solids not being associated with pigment solids.

In the above described system, the flow rate of the latex is predetermined and fixed at a substantially constant value. In start up, the following procedure can be used in determining and setting the rate of flow of the pigment dispersion to provide the desired resin/pigment ratio. Initially, the color of a sample of a concentrate used in formulating an autodepositing composition which is effective in forming coatings having the desired tinctorial strength is observed. The color of this sample is compared to the color of the concentrate initially produced by the system. Concentrate initially produced can be collected from pipe 19 as valve 22 is closed and valve 24 is opened. If its color does not correspond to the color of the aforementioned sample, control valve 14 is adjusted until the flow rate of the pigment dispersion through pipe 10 is such that the color of the pumped concentrate corresponds to that of the sample. Valve 24 is then closed as valve 22 is opened to allow the concentrate to flow into the storage tank. This color comparison procedure can be used where experience has shown that it is a valid method for producing a concentrate which, when used in an autodepositing composition, forms the desired colored coatings. Alternatively, the resin and pigment solids concentrations of an autodepositing composition which forms desired colored coatings can be determined and the flow rates of the latex and/or pigment dispersion can be adjusted to provide the desired resin/pigment ratio.

Turning to FIG. 2, there is illustrated apparatus that can be used in an automated system for preparing concentrate according to the present invention.

Pigment dispersion is pumped from its storage tank through pipe 32 by gear pump 31, past air-operated valve 39, which controls the rate of flow of the pigment dispersion, through flow meter 40, which senses the rate of flow of the pigment dispersion, and past 3-way air-operated plug valve 35, and air-operated valve 34, and into pipe 37, carrying latex at the juncture J'. If necessary, pigment dispersion can be drained from its storage tank through pipe 30 by opening the manually operated valve 33. For reasons explained below, pigment dispersion can be recycled to its storage tank through pipe 32' by appropriate adjustment of 3-way air-operated plug valve 35. Air-operated valve 34 functions to prevent backflow of latex into pipe 32 which carries pigment dispersion.

As can be seen from FIG. 2, the system includes two latex storage tanks. Latex can be pumped from either one or both of the tanks during the mixing operation. Latex is pumped from storage tank A by centrifugal pump 42, past valve 50, through pipe 37 and transducer flow meter 60, which senses the rate of the flow of the latex, and through pipe 41 where it is combined with pigment dispersion. The stream of combined latex and pigment dispersion is promptly subjected to the mixing action of centrifugal pump 42. By appropriate adjustment of three-way air-operated control valve 45, the concentrate from the pump flows through pipe 41' and into pipe 43 which opens into the concentrate storage tank. Similarly, latex is pumped from storage tank B through pipe 36 by centrifugal pump 42 past valve 52, through pipe 37 and transducer flow meter 60 and through pipe 41 where it is combined with the pigment dispersion.

For reasons explained below, latex can be recycled to the storage tanks through pipe 43' and pipes 36' and 38' by appropriate adjustment of valve 45. During the recycling operation, valves 56 and 58 are in the open position, valve 34 in the closed position and pigment dispersion is recycled through pipe 32'.

The rate of flow of the concentrate through pipe 43 can be adjusted by the hand-operated diaphragm valve 60. Valves 62 and 62' and valves 64 and 64' in pipes 43-A and 43-B respectively, can be operated to allow concentrate to flow through one or both of filters 66 and 68 which remove undesired solids that may be present in the concentrate. Batch meter 67 measures the amount of concentrate prepared. It can be automatically operated to turn the system off after the desired amount of concentrate is pumped to the storage tank. In shutting down the system, air-operated valve 70 closes as the final amounts of concentrate flow through by-pass pipe 43-C as air-operated valve 74 opens. This slows the flow rate of the concentrate and prevents hydraulic hammer.

Valve 76 can be used to siphon off some concentrate from pipe 43 for quality control testing. If, for any reason, it is desired to keep concentrate from flowing into the storage tank, three-way valve 78 can be adjusted to have the concentrate flow through pipe 80 into another container, not shown. Air-operated valve 82 is automatically opened as concentrate is pumped through pipe 43 and automatically closed when the pumping action is stopped.

In withdrawing concentrate from its storage tank through pipe 88, air-operated valve 84 is automatically opened as pump 86 is started. The concentrate flows through batch meter 90 which automatically turns off pump 86 after the desired amount of concentrate has been withdrawn.

Three-way air-operated valve 92, when in proper position, allows concentrate to be recycled into the storage tank through pipe 89. Recycling the concentrate is a way of mixing the stored concentrate, as needed.

When the desired amount of concentrate is withdrawn from the storage tank, and as the pumping operation is stopped, air-operated valve 91 closes as the final amounts of concentrate flow through by-pass pipe 88-A as air-operated valve 93 opens. This slows down the flow rate of the concentrate and prevents hydraulic hammer.

Depending upon the position of three-way valve 100, concentrate can be pumped through pipe 102 and past open valve 104 into shipment drum D or it can be pumped through pipe 88 through open valve 99 to tank truck T for shipment.

As may be needed, steam can be fed through pipe 106 and three-way valve 108 to purge the connected pipes of concentrate.

In starting up the system to mix the pigment dispersion and latex, batch meter 67 is set for the desired amounts of concentrate, and as pumps 42 and 31 are started, latex and pigment dispersion are recycled to their respective storage tanks, as described above. Recycling allows the flow rates of the separate streams of latex and pigment dispersion to reach a constant value. In the system shown, the flow rate of the latex is substantially constant. In contrast, the flow rate of the pigment dispersion is adjustable and can be set at various desired values. Thus, concentrates having different resin/pigment ratios can be produced as desired. When flow meter 60 senses that the desired flow rate of the latex stream is established, it adjusts through appropriate circuitry the air-operated valve 39 so that the flow rate of the stream of pigment despersion is such that the desired ratio is obtained. When both streams are flowing at the desired rates, valve 34 opens as valve 35 is adjusted to allow pigment dispersion to flow into the latex stream at juncture J' and as valve 45 is adjusted to allow concentrate to flow into pipe 43. In operation, good results have been achieved with laminar flow of each of the latex and pigment dispersion streams and with laminar flow of the stream containing both these constituents.

Various of the pieces of equipment, instruments, etc., referred to above are standard items of commerce and they, as well as their operation, are known to those in the field of fluid flow.

It should be appreciated that by utilizing the principles underlying the present development, the coating-forming material/pigment composition can be prepared in ways other than by use of the preferred embodiments described above. For example, instead of subjecting the stream of combined organic coating-forming material and pigment to a centrifugal pump or other type of mechanized mixer, it can be subjected to mixers of the type generally referred to as static or motionless mixers. Also, the aqueous dispersions of organic coating-forming material and pigment may be combined and mixed under conditions which result in turbulent conditions. For example, separate streams of turbulent-flowing coating-forming material and pigment may be combined with the turbulence thereof providing the desired mixing action. Still another example of a method for properly preparing the aqueous concentrate involves feeding pigment dispersion at a very slow rate into a vigorously agitated dispersion of the coating-forming material, with the agitation being maintained until all of the pigment dispersion has been added.

It is not fully understood why an autodepositing composition containing a resin/pigment component in which substantially all of the resin is associated with pigment forms coatings having uniform tinctorial strength or why such coatings are formed from compositions formulated from aqueous resin/pigment concentrates prepared according to the invention. The following is offered as an explanation which should not be construed to limit the scope of the claimed invention.

It is believed that various resin dispersions which contain surfactant for maintaining the resin solids in their dispersed state are surfactant-poor, that is, however the surfactant is associated with the resin particles, there is opportunity for the resin particles to associate with additional surfactant. When an aqueous resin dispersion is mixed with an aqueous pigment dispersion which contains surfactant for maintaining the pigment solids in their dispersed state, it is believed that the surfactant-poor resin particles tend to associate with the pigment's surfactant which itself is associated with pigment. Stated simply, the surfactant-poor resin particles and the pigment's surfactant are believed to have an affinity for each other.

In view of such affinity, it is theorized that in a mixing operation in which only a portion of the resin dispersion is initially contacted with substantially all of the pigment dispersion, the resin particles of that portion promptly associate with pigment particles and such association is believed to be irreversible, that is, mixing of the two dispersions does not effect disassociation. Accordingly, those resin particles not initially contacted with the pigment are in effect left in an unpigmented state. For convenience, resin particles associated with pigment will hereafter be referred to as "pigmented resin" and resin particles not associated with pigment will hereafter be referred to as "unpigmented resin".

The form of the pigmented resin in the composition is believed to include resin particles associated with their surfactant, with one end of the surfactant molecule being adsorbed on the surface of the resin particle and the other end oriented toward the aqueous phase of the composition. It is believed also that pigmented resin is associated with pigment particles and their surfactant, with molecules of the surfactant of the pigment being sandwiched between and adsorbed on the surfaces of both the pigment and resin particles. In addition, it is believed that other molecules of the pigment surfactant are associated with pigment particles in a manner such that one end of the surfactant molecule is adsorbed on the surface of the pigment particle and the other end is oriented toward the aqueous phase.

As to the reasons why an autodepositing composition containing both pigmented resin and unpigmented resin forms coatings which do not have uniform tinctorial strength, it is noted, as mentioned above, that this problem has been encountered when a panel is moved in the composition relatively rapidly. When such movement involves moving a panel with its faces substantially perpendicular to the direction of the movement, such as, for example, to and fro motion, the coating at the face edges of the panel is unpigmented, as described above. It has been observed also that if the panel is moved sufficiently fast in the composition with the faces of the panel being parallel to the direction of movement, the entire coating on the faces of the panel lacks tinctorial strength. In effect, the entire coating appears unpigmented. It is believed that when there is relatively rapid motion of the coating composition past the metal surface, as at the edges in the former case or the entire panel in the latter, the particle orientations are such that unpigmented particles deposit and pigmented particles do not.

As to such selective deposition, it is believed that the end groups of the molecules of pigment surfactant which are oriented toward the aqueous phase of the composition are nonreactive with the metallic surface, which it is believed has a positive charge as a result of being oxidized by the autodepositing composition. (Such nonreactive end groups can be present in a nonionic surfactant.) It is assumed also that the end groups of the molecules of the resin surfactant which are oriented toward the aqueous phase are capable of reacting with the positively charged metal surface. (Such reactive end groups can be present in anionic surfactants.) It is believed that the nonreactive end groups of the molecules of pigment surfactant in the regions where flow of the composition past the metal surface is relatively fast are oriented toward the metallic surface, and since they are not reactive therewith, the metal surface preferentially reacts with the reactive end groups of the molecules of the resin surfactant which are associated with unpigmented resin particles. In contrast, in situations where there is relatively slow or no movement of the composition past the metal surface, there is no driving force to cause selective orientation of the nonreactive end groups toward the metal. In this situation both unpigmented resin and pigmented resin with a reactive orientation deposit to form the desired pigmented coating.

In a resin/pigment concentrate in which the number of pigment particles is substantially equal to or greater than the number of resin particles, the process of the present invention can be used to produce a concentrate in which substantially all of the resin particles are associated with pigment particles. Accordingly, selective deposition of the type referred to above which results in the aforementioned problem is not encountered.

As to a concentrate in which the resin particles outnumber the pigment particles, it has been observed that an autodepositing composition formulated from such a concentrate when prepared according to the process of the present development, is capable of forming coatings which have uniform tinctorial strength. Although it is not fully understood why this occurs, it is believed that a concentrate prepared according to the process of present development, contains a much more uniform distribution of pigmented and unpigmented particles than a concentrate prepared according to a conventional process which in effect produces a relatively large amount of pigment particles associated with a relatively small amount of resin particles. Prepared according to the present development, it is believed that the pigmented resin particles have substantially the same amount of pigment particles associated with them and that the pigmented and unpigmented particles are uniformly distributed throughout the composition.

The particles of organic coating-forming material and pigment are described hereinabove as being associated with each other. It has been mentioned above also that once the association is achieved, it is substantially irreversible. It appears that the particles are strongly bonded or attached to one another so that they do not readily disassociate, even when subjected to vigorous mixing. It is not fully understood how the pigment particles are associated with or attached to the coating-forming particles. They may be adsorbed on the surfaces of the resin particles or bonded to the resin particles through surfactant or associated in some other way. By whatever means, the coating-forming particles carry with them and deposit on the metallic substrate pigment particles. The term "associated" as used herein means that the coating-forming particles carry pigment particles when they deposit on the substrate, and it is believed that this occurs due to the strong bond between the coating-forming and pigment particles.

The process of the development can be used to advantage in combining and mixing aqueous dispersions of organic coating-forming solids and pigment solids having characteristics such that an aqueous composition comprising these ingredients, when prepared according to the method described below, separates into a lower layer comprising an aqueous dispersion of organic coating-forming solids and pigment solids and an upper layer comprising an aqueous dispersion of a substantial amount of coating-forming solids and little or no pigment solids, such separation occurring, as a one liter sample of the composition is allowed to stand, within about 60 minutes after the composition has been prepared in a form which visually appears to be a homogeneous mixture of an aqueous dispersion of the coating-forming and pigment solids. The method used in preparing the aforementioned composition is as follows. A two liter quantity of the composition containing the desired proportion of solids of coating-forming material and pigment is prepared by adding an aqueous dispersion of pigment, in the amount needed to give said proportion, to a container and then mixing the dispersion until a vortex is formed therein. As the mixing is maintained, the needed amount of an aqueous dispersion of the coating-forming material is added to the pigment dispersion over a period of one hour. Mixing is continued for an additional five minutes.

It should be appreciated that the present invention can also be used to advantage in combining and mixing aqueous dispersions of organic coating-forming solids and pigment solids having characteristics such that an autodepositing composition formulated from an aqueous composition containing the ingredients forms coatings which are non-uniform in tinctorial strength, such non-uniformity being related to relative motion between the autodepositing composition and the substrate being coated.

As to other ingredients comprising the coating composition, U.S. Pat. Nos. 3,585,084 and 3,592,699 disclose the use of a variety of acids (for example, hydrofluoric, nitric, phosphoric, and acetic) and the use of a variety of oxidizing agents (for example, hydrogen peroxide, dichromate, nitrite, nitrate and chlorate). The ingredients are present in amounts which are effective in dissolving metal from the metallic surface immersed therein to form in the composition ions in a sufficient amount to cause the resin particles to deposit on the metallic surface in a manner such that the resinous coating grows with time. (Exemplary compositions disclosed in said patents are effective in dissolving at least about 25 mg/sq.ft. of an iron surface within the first minute of time the surface is immersed in the composition.) For this purpose, the composition contains sufficient acid to impart a pH of less than 7 to the composition, preferably to impart a pH thereto within the range of about 1.6 to about 3.8. The oxidizing agent is present in an amount sufficient to provide an oxidizing equivalent of at least about 0.01 per liter of the composition. The preferred composition described in the aforementioned patents comprises about 5 to about 550 g/l of resin solids, hydrofluoric acid in an amount sufficient to impart to the composition a pH within the range of 1.6 to about 3.8 and equivalent to about 0.4 to about 5 g/l of fluoride, and as an oxidizing agent, dichromate or most preferably hydrogen peroxide, in an amount to provide about 0.01 to about 0.2 of oxidizing equivalent per liter of composition.

U.S. Pat. No. 3,709,743 discloses an acidic aqueous coating composition having a resin solids content of about 2 to about 65 wt. %, preferably about 5 to about 20 wt. %, and nitric acid in an amount of about 0.1 to about 5 wt. %, preferably about 0.5 to about 2 wt. %, with the preferred pH of the composition being below about 2.

South African Patent No. 72/1146 discloses an acidic aqueous coating composition containing about 5 to about 550 g/l of resin solids, a soluble ferric-containing compound in an amount equivalent to about 0.025 to about 3.5 g/l ferric ion, and preferably about 0.3 to about 1.6 g/l of ferric ion, and acid in an amount sufficient to impart to the composition a pH within the range of about 1.6 to about 5.0. Optionally an oxidizing agent may be used in an amount to provide from about 0.01 to about 0.2 oxidizing equivalent per liter of composition. Examples of the aforementioned ferric-containing compounds are ferric fluoride, ferric nitrate, ferric chloride, ferric phosphate and ferric oxide. Examples of acids are sulfuric, hydrochloric, hydrofluoric, nitric, phosphoric, and organic acids, including, for example, acetic, chloracetic and trichloracetic. Examples of oxidizing agents are hydrogen peroxide, dichromate, permanganate, nitrate, persulfate and perborate. The preferred composition is described as being prepared from about 5 to about 550 g/l of resin solids, about 1 to about 5 g/l of ferric fluoride trihydrate, and hydrofluoric acid in an amount sufficient to impart to the composition a pH within the range of about 1.6 to about 5.0.

Belgian Patent of Addition No. 811,841 discloses a coating composition containing about 5 to about 550 g/l of resin solids, a metal-containing compound which is soluble in the composition and acid to impart to the composition a pH within the range of about 1.6 to about 5.0. Examples of the soluble metal-containing compound are silver fluoride, ferrous oxide, cupric sulfate, cobaltous nitrate, silver acetate, ferrous phosphate, chromium fluoride, cadmium fluoride, stannous fluoride, lead dioxide, and silver nitrate. The metal compound is present in the composition in an amount within the range of about 0.025 to about 50 g/l. Examples of acids that can be employed are sulfuric, hydrochloric, hydrofluoric, nitric and phosphoric and organic acids such as acetic, chloracetic and trichloracetic. The use of hydrofluoric acid is preferred. Optionally, an oxidizing agent may be used in an amount sufficient to provide from about 0.01 to about 0.2 of oxidizing equivalent per liter of composition. Examples of oxidizing agents are hydrogen peroxide, dichromate, permanganate, nitrate, persulfate and perborate.

British Pat. No. 1,241,991 discloses an acidic aqueous coating composition containing an oxidizing agent and solid resin particles stabilized with an anionic surfactant. The composition is substantially free of nonionic surfactant. The resin particles comprise about 5 to about 60 wt. %, preferably about 10 to about 30 wt. %, of the composition. The anionic surfactant comprises about 0.5 to about 5 wt. %, preferably about 2 to about 4 wt. %, based on the weight of the resin. Examples of anionic surfactants are the alkyl, alkyl/aryl or naphthalene sulfonates, for example sodium dioctyl sulphosuccinate and sodium dodecylbenzene sulfonate. The oxidizing agent is described as being of the kind commonly known as a depolariser, and preferably is present in the composition in an amount of about 0.02 to about 0.2 N. Examples of oxidizing agents are hydrogen peroxide, p-benzoquinone, p-nitrophenol, persulfate and nitrate. Acids such as phosphoric, hydrochloric, sulfuric, acetic, trichloracetic and nitric are used to impart to the composition a pH of preferably less than 5, most preferably less than 3.5.

With regard to the resin or other organic coating-forming particles dispersed in the composition, it should be noted that these particles may carry a charge of their own, for example, an anionic charge. Also, certain organic coating-forming materials inherently do not carry a charge, for example, nonionic materials, but they may be charged by the presence of an ionizable material such as surfactant.

With regard to the source of the resin in autodepositing compositions, it is preferably supplied as a latex. Of course, the dispersed resin present in the form of a latex should be stable in the presence of the other constituents comprising the autodepositing composition.

The amount of resin solids dispersed in the acidic aqueous coating composition can vary over a wide range. The lower concentration limit of the resin solids in the coating composition is dictated by the amount of resin required to supply sufficient material to form a resinous coating. The upper limit is dictated by the amount of resin solids which can be dispersed in the pigmented composition. In general, the higher the amount of resin solids in the coating composition, the heavier the coating formed. Coatings having a thickness within the range of about 1 mil can be formed in practical operating times with the use of about 50 to 100 g/l of resin solids. Speaking generally, the composition can comprise about 5 to about 550 g/l of resin solids or other organic coating-forming material.

Dispersions of insoluble resin particles in water, for use in the composition are readily available commercially, and a few examples of such commercially available materials are as follows:

Darex 637—manufactured by W. R. Grace
Darex 510—manufactured by W. R. Grace
Goodrite 1800×73—manufactured by B. F. Goodrich Co.

An example of a resin for use in autodepositing compositions which can be formulated from a resin/pigment concentrate prepared according to the present development is one which is prepared by polymerizing a conjugated diene, $CH_2=CH-R$ wherein R is aryl or cyano, a vinyl halide, and a monomer containing an amide or carboxylic functional group. This resin can be prepared by copolymerizing the following monomers:

(1) conjugated diene having, for example, 4 to about 9 carbon atoms, such as butadiene or isoprene;
(2) $CH_2=CH-R$, wherein R is an aryl or cyano group, for example, styrene or acrylonitrile;
(3) a vinyl halide such as vinyl chloride or vinylidene chloride; and
(4) a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example: acrylic acid; cinnamic acid; methacrylic acid; crotonic acid; itaconic acid; maleic acid; and fumaric acid.

Although the constituents comprising the above-described resin can vary over a relatively wide range, in general, the resin will comprise the polymerized constituents in the following amounts:

(1) about 25 to about 70, and preferably about 40 to about 65 wt. % of the conjugated diene;
(2) about 5 to about 70, and preferably about 30 to about 65 wt. % of the $CH_2=CHR$ monomer;
(3) about 1 to about 50, and preferably about 3 to about 15 wt. % of the vinyl halide; and
(4) about 0.5 to about 15, and preferably, about 1 to about 4 wt. % of the aforementioned functional group-containing monomer.

The resin is used most conveniently in the form of a latex, that is, an aqueous dispersion of solid particles of the resin. The resin can be prepared according to available techniques, for example, by bulk or emulsion polymerization processes, the latter being preferred. Some examples of emulsifiers that can be used in the polymerization process for preparing the resin are sulfates, sulfonates, and sulfosuccinates. Peroxides, hydroperoxides and persulfates, for example, potassium persulfate, are examples of initiators that can be used in the polymerization process. Buffers such as phosphates, citrates, acetates and other weak acid salts can be used. Mercaptans, such as dodecyl mercaptan, are examples of chain transfer agents that can be used in the polymerization process.

Latices comprising the above resin are known. For example, see U.S. Pat. No. 3,472,808.

Any suitable polymerization process can be used to prepare latices containing resin particles having the above-described properties. An example of such a process is one referred to herein as the "seed polymerization" process. The seed polymerization process involves continuously adding monomer and emulsifier at a controlled rate to a relatively small amount of latex, the resin particles of which function as a seed to provide nucleating sites for polymerization of the monomer. The controlled rate of the monomer addition consists of adding monomer so that it becomes associated with the resin particles of the latex essentially as soon as the monomer enters the reaction zone. Thus, monomer is added so that a separate monomeric phase is not formed in the reaction mixture and monomer becomes a part of the resin particle by being adsorbed or dissolved therein. The controlled rate of adding emulsifier consists of adding it in an amount that is proportional to the rate of growth of the surface area of the polymeric particles.

Typically, the seed polymerization process is carried out by charging a latex to a reaction vessel or forming it in situ. After heating the reaction vessel to the desired polymerization temperature, a polymerization initiator is added and monomer is added at a rate such that a separate monomeric phase is not formed. Instead, monomer becomes associated with the resin particles substantially as soon as it is added. An emulsifier is added concurrently with monomer to the reaction mixture at a rate which is proportional to the rate of growth of the total surface area of the polymeric particles In general, this involves adding emulsifier at a rate such that about 30 to 70% of the surface area of the particle is covered with emulsifier, and preferably at a rate such that about 50% of the surface area of the polymeric particle is covered. The process is carried out with continuous agitation. After the addition of monomer and emulsifier, the polymerization is continued until the original seed particles of the latex have reached the desired size. This will generally be about 2 to about 9 times the size of the diameter of the original particles, but preferably is a size which is about 3 to about 4 times the size of the diameter of the original particles.

The seed polymerization process can be used to prepare a wide variety of polymers from a conjugated diene monomer such as butadiene, isoprene, or 2,3-dimethyl-1,3-butadiene and from a monomer or monomers such as styrene, acrylonitrile, acrylic acid, methacrylic acid and butylacrylate. The following are examples of copolymers that can be prepared by the polymerization process: styrene/butadiene; styrene/butadiene/acrylonitrile; styrene/butadiene/acrylic acid; styrene/butadiene/methacrylic acid; styrene/butadiene/butylacrylate; styrene/butadiene/butylacrylate/acrylic acid; styrene/butadiene/butylacrylate/methacrylic acid; butadiene/acrylonitrile; butadiene/acrylonitrile/acrylic acid; and butadiene/acrylonitrile/methacrylic acid.

Initiators and emulsifiers are used in the seed polymerization process. Examples of initiators that can be used are: potassium persulfate; ammonium persulfate; p-menthane hydroperoxide/sodium sulfoxylate formaldehyde/ferrous sulfate; cumene hydroperoxide/sodium sulfoxylate formaldehyde/ferrous sulfate; p-menthane hydroperoxide/sodium bisulfate/ferrous sulfate; potassium persulfate/sodium bisulfite/ferrous sulfate; potassium persulfate/sodium bisulfite; a,a'-azobisisobutyronitrile; and hydrogen peroxide/dextrose/ferrous sulfate.

Examples of emulsifiers that can be used are: sodium lauroyl sarcosinate; disproportioned rosin acid salt; sodium dodecyl benzene sulfonate; ammonium nonyl phenol polyglycol ether sulfate; salt of polyethyleneoxy phosphate ester; potassium oleate; sodium dioctyl sulfosuccinate; sodium dodecyldiphenyl oxide disulfonate; sodium oleoyl isopropanolamide sulfosuccinate; and sodium lauryl sulfate.

The resin particles of latices produced according to the seed polymerization process can be characterized as being chemically and physically homogeneous. As to the chemical homogeneity of the particles, the ratio of the constituent monomers are substantially the same from particle to particle. As to physical homogeneity, the sizes of the particles are relatively uniform. For example, with latices having an average particle size in the range of about 1,000 to about 3,500 A, the deviation in particle size from the average is a maximum of about ±200 A.

Exemplary properties of latices produced by the seed polymerization process are as follows: surface tension within the range of about 40 to about 65 dynes/cm; pH within the range of about 4 to about 8.5; and solids content within the range of about 45 to about 55 wt. %. The seed polymerization process can be conducted utilizing a relatively small amount of emulsifier or surfactant, for example, an amount within the range of about 1 to about 4% based on the resin solids.

The polymerization process described in U.S. Pat. No. 3,397,165 is exemplary of a seed polymerization process. It should be understood that latices containing resin particles which are substantially uniform in physical and chemical makeup can be produced according to other available techniques.

A particularly preferred latex for use in autodepositing compositions formulated from resin/pigment concentrate prepared according to the present invention contains particles of resin prepared from the aforementioned monomers as described above, which particles are chemically and physically homogeneous. The resin particles of the preferred latex are prepared from styrene, butadiene, vinylidene chloride and methacrylic acid. In addition, the surfactant content of the preferred latex is about 1 to about 4% based on the resin solids and comprises at least 90 wt. percent, most preferably 100 wt. percent of an anionic surfactant such as a sulfonate, for example, sodium dodecylbenzene sulfonate, or a sulfosuccinate, or a mixture thereof.

Examples of suitable pigments to be employed in the practice of the present development are carbon or furnace black, phthalocyanine blue, phthalocyanine green, quinacridone red, Hansa yellow, and benzidine yellow. These pigments are available commercially as aqueous dispersions.

With regard to the amount of pigment for use in the autodepositing composition, it can vary over a wide range. The lower concentration limit of the pigment particles in the coating composition is dictated by the amount of pigment needed to impart to the autodeposited coating the desired degree of color or tinctorial strength. It is of course understood the specific amount of pigment used will be governed by the specific pigment employed and the color or degree of color or tinctorial strength desired. The highest concentration limit of pigment particles in the composition is dictated by the amount that can be incorporated in the composition without its adversely affecting the autodepositing process. This can vary depending on the specific pigment dispersion employed and the particular type of autodepositing composition used.

As regards the problem of nonuniformity of tinctorial strength, several comments can be made concerning the pigment concentration of the autodepositing composition. It has been observed that the problem can be avoided by increasing the amount of pigment in the composition. For example, in using a pigment dispersion containing carbon black, the problem has been avoided by increasing the carbon black concentration over and above the amount which gives coatings which are jet black. (In effect, the composition is flooded with a sufficiently high amount of pigment particles for associating with the resin particles.) This approach is not particularly desirable because more pigment is being used than is necessary. Another problem that has been encountered with this approach is that it has been observed, as is illustrated in the examples below, that the use of relatively large amounts of pigment dispersion can adversely affect the autodepositing process. It has been observed also that even when using a resin/pigment concentrate prepared in accordance with the present invention, there is an amount of pigment below which the problem is still encountered. Because of the numerous variables inherent in the process, it is difficult, if not impossible, to identify the lower and higher amounts of pigment at which the aforementioned problems are encountered. Such amount values depend on the specific type of pigment used, the specific types of surfactant used, and the nature of the autodepositing composition. From a practical standpoint, it is expedient to prepare a small batch of the autodepositing composition and observe the results obtained. The amount of pigment and/or the activating ingredients of the autodepositing composition can be adjusted accordingly.

The amounts of the solid ingredients comprising concentrates prepared according to the present invention can be varied as desired. In general, it is recommended that the aqueous concentrate comprise about 350 to about 650 g/l of solids of organic coating-forming material and about 5 to about 35 g/l of pigment solids.

A preferred autodepositing coating composition to be used in the present invention is one in which the resin/pigment composition is dispersed in an aqueous solution which is prepared by combining a soluble ferric-containing ingredient, most preferably ferric fluoride, and hydrofluoric acid. In preparing the preferred autodepositing composition, the following aqueous concentrate can be used: a resin/pigment composition comprising about 350 to about 550 g/l of resin solids and about 5 to about 35 g/l of pigment solids.

The autodepositing composition can be prepared by stirring water into the resin/pigment composition and thereafter adding the required amount of an aqueous solution comprising HF and the ferric-containing compound.

A highly preferred autodepositing composition comprises about 50 to about 125 g/l of resin solids, ferric fluoride, in an amount equivalent to about 0.5 to about 2 g/l of ferric iron, and about 0.7 to about 3 g/l of HF, the pH of the composition being within the range of about 2 to about 3.2, and wherein the ratio of pigment solids to resin solids is within the range of about 0.005:1 to about 0.05:1.

EXAMPLES

In order to demonstrate the present invention, there are presented below a series of examples showing the use thereof. Comparative examples are set forth also.

EXAMPLE 1

This example illustrates the preparation of a laboratory amount of aqueous resin/pigment concentrate and the use thereof in an autodepositing composition which forms coatings having uniform tinctorial strength. Unless stated otherwise, the term "percent" means wt. percent based on the total weight of the stated composition.

Five grams of an aqueous carbon black pigment dispersion (sold under the trademark Aquablak 115) were added to a beaker. Thereafter, 180 g of a latex containing about 54 percent solids (the resin of the latex comprising about 62 percent styrene, about 30 percent butadiene, about 5 percent vinylidene chloride, and about 3 percent methacrylic acid) were poured into the beaker rapidly over a period of about 10 seconds with vigorous stirring. With such quantities of constituents, this mixing technique is effective in giving substantially all of the resin particles substantially the same opportunity to associate with the pigment particles.

The water soluble content of the latex employed was about 2 percent based on the weight of dried resin, with the water soluble content comprising about 10 percent sodium phosphate, about 13 percent sodium oleoyl isopropylamide sulfosuccinate, and about 75 percent dodecylbenzene sulfonate. The sodium phosphate is a buffering agent used in preparing the latex and the other water soluble materials are surfactants. The pH of the latex is about 7.8 and the surface tension thereof about 45–50 dynes/cm. The average particle size of the resin in said latex is about 2000 A.

The black pigment dispersion employed has a total solids content of about 36 percent. The carbon black comprises about 30 percent of the dispersion. It has a pH of about 10 to about 11.5 and a specific gravity of about 1.17. The dispersion contains a nonionic surfactant.

An autodepositing composition was prepared by combining the above resin/pigment composition, 3 g of ferric fluoride, 2.3 g of hydrofluoric acid, and water to make 1 liter.

A 3"×4" cold rolled steel panel was cleaned with a conventional alkali cleaner and rinsed with water. Thereafter the panel was immersed in the above coating composition with agitation (to and fro motion) for about 90 seconds. The panel was removed from the coating composition and dried in air for 1 minute, immersed in a water rinse for 30 seconds, and thereafter the coating was fused in an oven for 10 minutes at 170° C. The coating was visually observed to be uniformly black with no lack of tinctorial strength on any of its area, including its face edges.

EXAMPLE 2

This example is similar to that of Example 1, except for the use of larger quantities of the resin/pigment constituents in preparing the concentrate.

The black pigment dispersion and the latex employed in Example 1 were used to prepare an aqueous resin/pigment composition according to the following method. Fifty grams of the black pigment dispersion were added to a large beaker and thereafter 1800 g of the latex were rapidly added to the pigment dispersion while stirring vigorously for about 10 seconds. This mixing technique, with such quantities of constituents, is effective in giving substantially all of the resin particles substantially the same opportunity to associate with the pigment particles.

An autodepositing composition was prepared by combining 185 grams of the above resin/pigment composition with 3 grams of ferric fluoride, 2.3 grams hydrofluoric acid, and water to make one liter.

A 3"×4" unpolished cold rolled steel panel was cleaned with a conventional alkali cleaner and rinsed with water and thereafter immersed in the above coating composition with agitation (to and fro motion) for a period of 90 seconds. The coated panel was thereafter dried in air for 1 minute, immersed in a water rinse for 30 seconds, and thereafter the coating was fused in an oven for 10 minutes at 170° C. The coated panel was visually observed and the result, as shown in Table I below, was a uniformly black coating on all areas of the panel.

EXAMPLE 3

This example illustrates a mixing technique different from that used in Examples 1 and 2 to prepare a laboratory amount of aqueous resin/pigment concentrate and the use thereof in an autodepositing composition which forms coatings having uniform tinctorial strength. The latex and pigment dispersion used are those described in Example 1.

A resin/pigment composition was prepared by first adding 3600 g of latex to a 4 liter beaker and thereafter adding 100 g of black pigment dispersion to the beaker by means of a separatory funnel, such that all of the black pigment dispersion had been added over a period of 1 hour. During addition of the pigment dispersion, stirring was accomplished rapidly enough so that a vortex in the composition was maintained. This mixing technique was effective in giving substantially all of the resin particles substantially the same opportunity to associate with pigment particles.

A coating composition was prepared by combining 185 g of the above prepared resin/pigment composition with 3 g of ferric fluoride, 2.3 g of hydrofluoric acid, and water to make 1 liter.

A 3"×4" cold rolled steel panel was cleaned with a conventional alkali cleaner and rinsed with water and thereafter immersed in the coating composition with agitation (to and fro motion) for a period of 90 seconds. The panel was thereafter removed from the coating composition and air dried for 1 minute, immersed in a water rinse for 30 seconds, and thereafter the coating was fused for 10 minutes in an oven at 170° C. The coated panel was thereafter visually observed and the result, as shown in Table 1 below, was a uniformly black coating on all areas of the panel.

The next two examples are set forth for comparative purposes. The latex and pigment dispersion used in the comparative examples are the same as those used in Examples 1-3 above.

EXAMPLE A

A resin/pigment composition was prepared by adding 50 g of black pigment dispersion to a large beaker. The pigment dispersion was stirred such that a vortex was maintained therein. Eighteen hundred grams of latex were added gradually to the pigment dispersion over a period of 1 hour. Upon termination of the mixing action, the mixture appeared visually to be a homogeneous dispersion of the latex and pigment. Upon close visual inspection of the top surface of the mixture, white swirls of material were observed. (It is noted that the latex used is milky white in appearance). In less than an hour, the mixture separated into two layers, with the bottom layer being black and the top layer being an overall grayish color and containing white swirls and patches. It is believed that the resin particles of that portion of the latex initially added to the pigment dispersion associated with substantially all of the pigment particles so that few, if any, pigment particles were left to associate with the resin particles later added.

A coating composition was prepared by combining 185 g of the above resin/pigment composition with 3 g of ferric fluoride, 2.3 g of hydrofluoric acid, and water to make 1 liter. A 3"×4" cold rolled steel panel, which had been cleaned with a conventional alkali cleaner and rinsed with water, was immersed in the coating composition with agitation (to and fro motion substantially the same as that of Examples 1-3 above) for a period of 90 seconds. The coated panel was removed from the coating composition and air dried for a period of 1 minute, immersed in a water rinse for 30 seconds, and thereafter the coating was fused for 10 minutes in an oven at 170° C. The coated panel was visually observed and was found to have clear face edges, as noted in Table 1 below.

It is noted that prior to formulating the autodepositing from the concentrate, it was stirred until the concentrate appeared visually to be homogeneous.

It is noted also that autodepositing compositions formulated from aqueous resin/pigment compositions of the type described in Examples 1-3 and A are bluish-gray in color, being formulated from a latex having a white milky appearance and a pigment dispersion which is very black. The wet coatings formed from such compositions are also bluish-gray in color. The coating turns jet black after being heated and fused. Upon careful inspection of the wet coated panel immediately upon its being withdrawn from the autodepositing composition of this example, it can be seen that the face edges of the coating are bluish-white in contrast to the bluish-gray appearance of the other portions of the coating. In the fused coating, the face edges are clear, as mentioned above.

EXAMPLE B

A resin/pigment composition was prepared by first adding 600 g of latex to a large beaker and thereafter adding 50 g of black pigment dispersion with stirring. This mixture was stirred for a period of 1 hour and thereafter 1200 g of additional latex were added slowly over a period of 45 minutes as mixing was continued. After termination of the mixing operation, the appearance of the composition was similar to the appearance of the composition of Example A, that is, it visually appeared to be homogeneous. However, within the hour, it separated into two layers of the type described in Example A. It is believed that the resin particles of the first batch of latex added to the pigment dispersion associated with substantially all, or at least a substantial portion of, the pigment particles so that few, if any, pigment particles were left to associate with the resin particles of the second batch of latex that was added.

An autodepositing composition was prepared by combining 185 g of the above resin/pigment composition (after it was restirred) with 3 g of ferric fluoride, 2.3 g hydrofluoric acid, and water to make 1 liter. A 3"×4" cold rolled steel panel which had been cleaned with a conventional alkali cleaner and rinsed with water, was immersed in the above coating composition with agitation (to and fro motion substantially the same as that of Examples 1-3 above) for a period of 90 seconds. Thereafter the coated panel was removed and air dried for 1 minute, immersed in a water rinse for 30 seconds, and the coating was fused for 10 minutes in an oven at 170° C. The coating was visually observed and was found to have clear face edges, as noted in Table 1 below.

Table I

| Coating Composition | Appearance of Coating |
|---|---|
| Example 2 | uniform black coating on all areas of panel |
| Example 3 | uniform black coating on all areas of panel |
| Example A | face edges of coating clear and other portions uniformly black |
| Example B | face edges of coating clear and other portions uniformly black |

The results of the above examples show the criticality of preparing the aqueous resin/pigment concentrate in a manner such that substantially all of the particles of coating-forming material have substantially the same opportunity to associate with the pigment particles.

Steel panels of the type described above are immersed in the autodepositing compositions of Examples 1 to 3 and A and B and are coated as described, except that the panels are positioned and moved in the compositions in a manner such that the faces of the panels are parallel to the direction of movement. The entirety of the coatings formed from the compositions of A and B have a brownish transparent appearance whereas those formed from the compositions of Examples 1 to 3 have a uniformly jet black appearance.

Steel panels of the type used in Examples A and B are coated with the autodepositing compositions of Examples A and B as described, except that the panels are moved in the compositions with a slower to and fro motion. (In Examples A and B, the panels were moved with a to and fro motion over a distance of about 2"/cycle, that is, about 1" forward and about 1" backward. The speed of movement was such that the panel was moved about 1 cycle/second. The slower to and fro motion involved moving the panel about 2 cycles every 10 seconds.) The coatings, including the face edges, were uniformly black.

The next example illustrates the preparation of an industrial quantity of resin/pigment concentrate according to the present development.

EXAMPLE 4

The concentrate of this example was prepared from the laxtex and pigment dispersion described in Example 1. Preparation of the concentrate is described in connection with FIG. 1.

The latex storage tank contained about 3000 gallons of latex and the pigment dispersion storage tank contained about 90 gallons of pigment dispersion. The pipe 2 carrying the latex stream had a diameter of about 1 inch and the pipe 10 carrying the pigment dispersion stream had a diameter of about ⅜ inch. The diameters of the pipes 16 (carrying the stream of combined latex and pigment dispersion) and 18 (carrying the concentrate) were also about 1 inch. The centrifugal pump 4 was rated at 25 gpm, but due to head factors, frictional losses, etc., it delivered about 17 gpm of concentrate. The length of the pipe 16 between juncture J and pump 4 was about 13 inches. Control valve 14 was adjusted to give a flow rate of the pigment dispersion such that about 1.95 parts of pigment solids were combined with every 100 parts of resin solids. Somewhat over 3000 gallons of concentrate were produced. The concentrate did not separate into layers and after a period of several days showed no tendency to do so.

An autodepositing composition was prepared from a 185 gram sample of the concentrate. The sample was diluted with water and thereafter an aqueous concentrate of ferric fluoride and HF was added to the diluted concentrate, the amounts of water and other ingredients being such that 1 liter of the composition contained said 185 g sample, about 3 g of ferric fluoride and 2.3 g of HF. The composition was used to coat a steel panel using the procedure described in Example 1. The coating, including its face edges, was uniformly black.

The next example is a comparative example and illustrates that when the basic mixing technique used to prepare the laboratory quantity of the resin/pigment concentrate of Example 1 is used in preparing larger quantities of concentrate, different results are obtained.

EXAMPLE C

The concentrate of this example was prepared from the latex and pigment dispersion described in Example 1. About 1.1 gallons of the pigment dispersion were added to a container and thereafter about 43.9 gallons of the latex were poured into the container rapidly with vigorous stirring which was effected with a Lightnin mixer having a propeller which rotated at about 1725 rpm. The mixture was stirred for about 1 hour. An autodepositing composition formulated from a sample of this concentrate in the manner described in Example 1 and used to coat a steel panel in the manner described in Example 1 formed a coating which was transparent at the face edges of the panel. The concentrate separates into two layers of the type described in Examples A and B within one hour after termination of mixing action.

The next series of examples illustrate the use of autodepositing compositions formulated from different amounts of pigment dispersion and the effect thereof on coating thickness.

EXAMPLE 5

The autodepositing compositions of this example were prepared from the latex and pigment dispersion described in Example 1. One liter batches of each of the compositions contained 180 g of latex, 3 g of ferric fluoride, 2.3 g of HF and the amount of pigment dispersion identified in Table 2 below. Each of the compositions which contained pigment was prepared from an aqueous concentrate of resin/pigment prepared in the manner described in Example 1. The concentrates were diluted with water and the coating compositions were prepared by adding to the diluted concentrates appropriate amounts of aqueous concentrates of ferric fluoride and HF. The compositions were used to coat panels according to the procedure described in Example 1. Table 2 below shows the coating thickness obtained and the surface tension of the compositions.

Table 2

| Ex. | Amount of Pigment Dispersion, g/l | Coating Thickness, mil | Surface Tension, dynes/cm |
|---|---|---|---|
| 5-A | none | 1.1 | 54.4 |
| 5-B | 5 | 1.1 | 50.4 |
| 5-C | 10 | 1.0 | 50.0 |
| 5-D | 25 | 0.85 | 47.0 |
| 5-E | 50 | 0.1 | 47.0 |
| 5-F | 100 | <0.05 | 50.0 |

From the results reported in Table 2, it can be seen that the use of relatively large amounts of pigment dispersion deterred or inhibited coating formation. It has been explained above that it is believed that surfactant-poor resin particles and surfactant of the pigment have an affinity for each other. The latex used in the examples set forth herein is an example of a latex which contains a relatively small amount of surfactant for maintaining the resin particles in their dispersed state. The concentration of the surfactant in the aqueous phase of the latex is below the critical micelle concentration and below the surfactant concentration which corresponds to the inflection point on a graph of surface tension (dynes/cm plotted as the ordinate) versus the logarithm of surfactant concentration (plotted as the abscissa). It is theorized that the decreases in coating weights shown in Table 2 above are experienced because of the increased proportion of the surfactant of the pigment that is obtained as a result of the additional amounts of pigment dispersion added.

It has been reported that the particle size of the carbon black used in the compositions of the above examples falls within the range of about 40 to about 50 m$\mu$. As noted above, the particle size of the resin is about 2000 A. Assuming a particle size of the carbon black of 40 m$\mu$, calculations show that a composition containing about 1.5 parts of carbon black for every 100 parts of resin is one in which there is about 1 resin particle for every carbon black particle. Assuming a particle size of the carbon black of about 50 m$\mu$, calculations show that a composition containing about 1.5 parts of carbon black for every 100 parts of resin is one in which there are about 2 resin particles for every carbon black particle.

A preferred aqueous resin/pigment concentrate containing resin particles of the type present in the latex of the above examples and a pigment of the type used in the above examples comprises:

(A) about 100 parts of resin particles having an average particle size of about 2000 A and associated with an anionic surfactant;

(B) about 0.6 to about 4.5 parts, preferably about 0.9 to about 3 parts of pigment particles having an average particle size within the range of about 40 to about 50 mµ and associated with a nonionic surfactant; and (C) about 70 to about 150 parts of water.

In a concentrate prepared according to the present invention in which the number of resin and pigment particles is substantially the same or in which the pigment particles outnumber the resin particles, substantially all of the resin particles are associated with pigment particles. If on the other hand, the concentrate contains more resin than pigment particles, the pigment particles are substantially uniformly associated with the resin particles and substantially all of those resin particles associated with pigment particles are associated with substantially the same number of pigment particles.

It should be appreciated that latices and pigment dispersions other than those used in the illustrative examples presented herein can be used in the practice of the present invention.

In summary, it can be said that the present development affords a practical means for alleviating or avoiding a very complex and difficult problem.

I claim:

1. An aqueous composition consisting essentially of a mixture of latex which includes resin particles and an aqueous dispersion of pigment particles, the resin and pigment particles having an affinity for each other, and in which substantially all of the resin particles are associated with pigment particles in a manner such that the particles resist being dissociated even when subjected to vigorous mixing.

2. A composition according to claim 1 wherein the resin particles are associated with an anionic surfactant and the pigment particles are associated with a nonionic surfactant.

3. An autodepositing composition consisting essentially of the composition of claim 1.

4. An autodepositing composition consisting essentially of the composition of claim 2.

5. An aqueous composition consisting essentially of a mixture of latex which includes resin particles and an aqueous dispersion of pigment particles, the resin and pigment particles having an affinity for each other, the number of resin particles being in excess of the pigment particles, said composition being characterized in that the pigment particles are substantially uniformly associated with the resin particles and substantially all of those resin particles associated with pigment particles are associated with substantially the same number of pigment particles, and wherein said associated particles resist being dissociated even when subjected to vigorous mixing.

6. A composition according to claim 5 wherein the resin particles are associated with an anionic surfactant and the pigment particles are associated with a nonionic surfactant.

7. An autodepositing composition consisting essentially of the composition of claim 5.

8. An autodepositing composition consisting essentially of the composition of claim 6.

9. An industrial process for preparing an aqueous composition from a latex having dispersed therein resin solids and from an aqueous dispersion of pigment solids, the resin and pigment solids being present in the composition in a predetermined ratio, comprising providing said latex and an aqueous dispersion of said pigment solids, said solids having an affinity for each other, combining said latex and said aqueous dispersion under conditions whereby substantially all of said resin solids have substantially the same opportunity to associate with said pigment solids, the amounts of the resin and pigment solids combined being that needed to provide said ratio, and including subjecting the combined resin and pigment solids to a mixing action, said mixing action being effected prior to significant diffusion of said latex and said aqueous dispersion.

10. A process according to claim 9 including forming a stream of said latex and a stream of said aqueous dispersion and combining said streams to form a combined stream thereof under conditions effecting turbulent flow in said combined stream.

11. A process according to claim 10 including effecting turbulent flow in the uncombined streams and combining the turbulent flowing streams to form said combined stream.

12. A process according to claim 9 wherein said resin solids are associated with an anionic surfactant and wherein said pigment solids are associated with a nonionic surfactant.

13. A process according to claim 10 wherein said resin solids are associated with an anionic surfactant and wherein said pigment solids are associated with a nonionic surfactant.

14. An autodepositing composition consisting essentially of a composition prepared according to the process of claim 9.

15. An autodepositing composition consisting essentially of a composition prepared according to the process of claim 10.

16. An autodepositing composition consisting essentially of a composition prepared according to the process of claim 11.

17. An autodepositing composition consisting essentially of a composition prepared according to the process of claim 12.

18. An autodepositing composition consisting essentially of a composition prepared according to the process of claim 13.

19. A process for preparing an aqueous resin/pigment composition having a predetermined resin/pigment ratio comprising:

(A) forming a stream of latex having a predetermined amount of resin solids;

(B) forming a stream of an aqueous dispersion of pigment solids having a predetermined amount of pigment solids and having an affinity for said resin solids;

(C) combining each of said streams to form a combined stream of said resin and pigment solids;

(D) establishing and maintaining the flow rates of said streams of (A) and (B) to provide said resin/pigment ratio when said streams are combined; and (E) subjecting the resin and pigment solids of said combined stream to mixing action promptly after said combined stream is formed;

thereby preparing said composition having said predetermined resin/pigment ratio.

20. A process according to claim 19 wherein said resin solids are associated with an anionic surfactant and wherein said pigment solids are associated with a nonionic surfactant.

21. An autodepositing composition consisting essentially of a composition prepared according to the process of claim 19.

22. An autodepositing composition consisting essentially of a composition prepared according to the process of claim 20.

* * * * *